March 18, 1952     E. L. FARLEY     2,589,932
FISH BAIT
Filed Sept. 7, 1948     2 SHEETS—SHEET 1
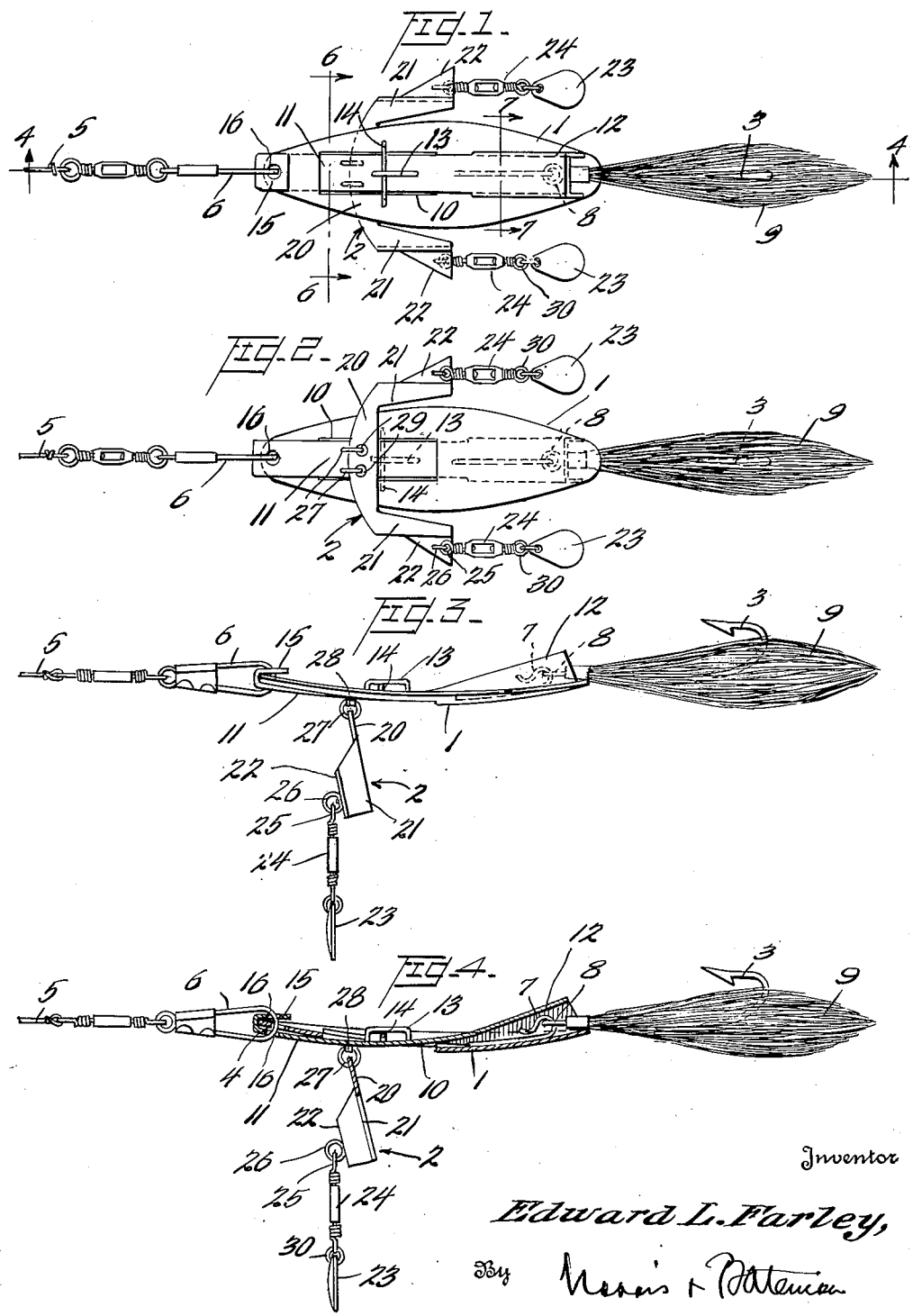
Inventor
Edward L. Farley,
Attorneys March 18, 1952     E. L. FARLEY     2,589,932
FISH BAIT
Filed Sept. 7, 1948     2 SHEETS—SHEET 2
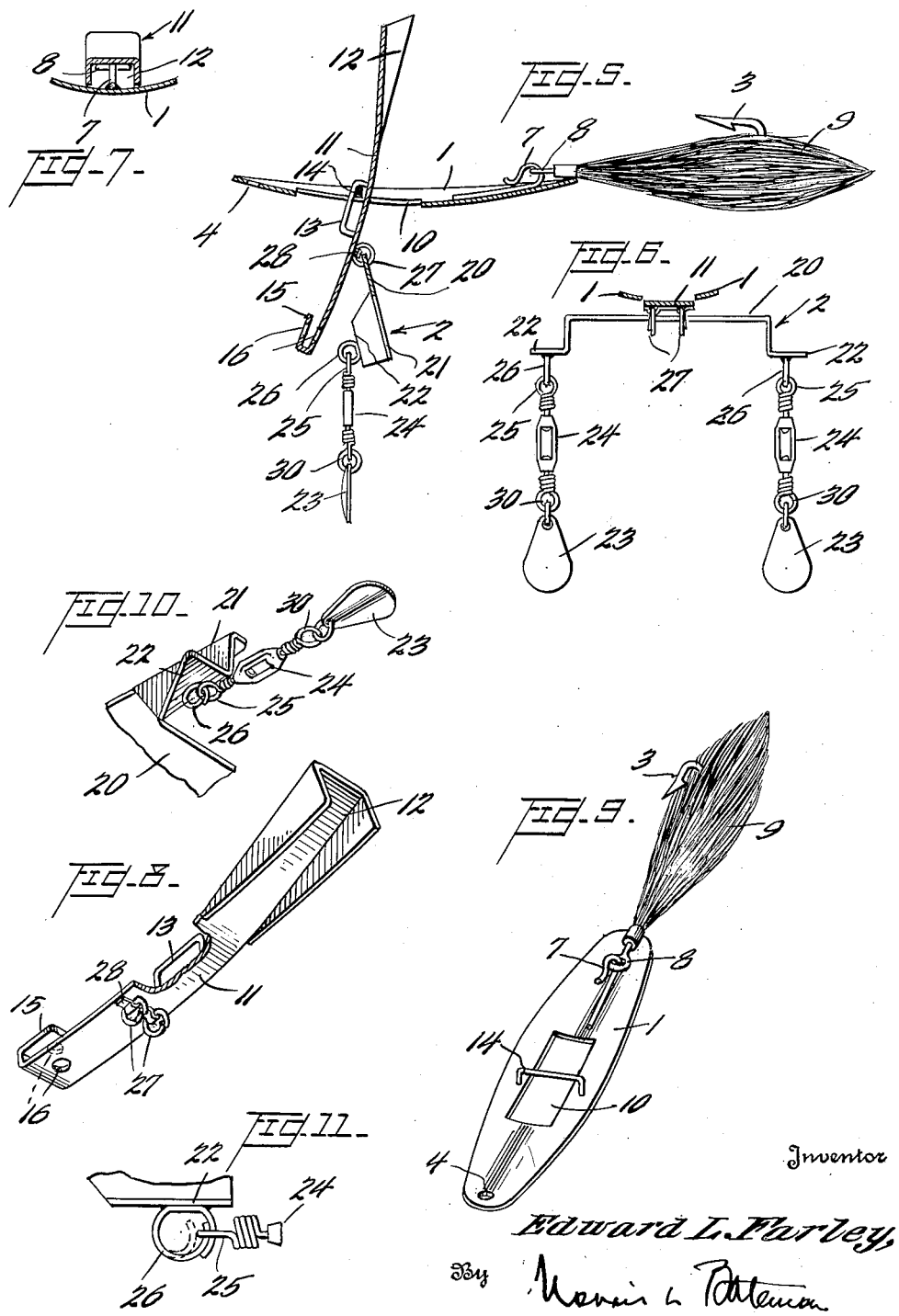
Inventor
Edward L. Farley,
By
Attorneys Patented Mar. 18, 1952

2,589,932

UNITED STATES PATENT OFFICE 2,589,932

FISH BAIT

Edward L. Farley, Lakeland, Fla.

Application September 7, 1948, Serial No. 48,100

10 Claims. (Cl. 43—42.08)

1

The present invention relates to an artificial fish bait, and it provides certain improvements over the fish lures shown in my prior Patents No. 1,731,161, granted October 8, 1929 and No. 1,854,024, granted April 12, 1932.

One of the primary objects of the present invention is to provide a novel and improved fish bait which is attractive in action to induce fish to strike it.

Another object is to provide improved means for attaching the fish hook to the body of the bait so that the point of the hook will extend rearwardly beyond the body and will be held in an upright position, either upwardly or downwardly, as desired.

Another object is to provide a guard for retaining the fish hook in engagement with its attaching means and for permitting controlled angular movement of the hook relatively to the body of the bait.

Another object is to provide improved means for attaching the fish hook to the body whereby different hooks, whether clothed or unclothed, and of different lengths or sizes, may be attached interchangeably to the bait body with facility by hand, and without requiring the use of tools.

A further object of the invention is to provide a novel and improved decoy and novel means for attaching it to the bait body whereby decoys of different colors or sizes may be readily attached interchangeably to the bait body by hand and without requiring the use of tools.

To these and other ends, the invention consists in certain novel combinations and arrangements of parts, all as will be hereinafter described in detail, the features of novelty being pointed out more particularly in the claims at the end of this specification.

In the accompanying drawing:

Figure 1 is a top plan view of the improved fish bait, the decoy being shown in the trailing position which it occupies while the bait is being drawn through the water.

Figure 2 is a bottom plan view of the bait, showing the decoy in trailing position.

Figure 3 is a side elevation of the bait, showing the decoy in the pendant position which it occupies while the bait is relatively motionless in the water.

Figure 4 is a central vertical longitudinal section through the bait, taken on the line 4—4 in Fig. 1 but showing the decoy in pendant position.

Figure 5 is a section taken centrally and longitudinally through the bait, showing the guard released and swung into position to permit changing of the fish hook.

2

Figure 6 is a transverse vertical section taken on the line 6—6 in Fig. 1 but showing the decoy in pendant position.

Figure 7 is a detail transverse vertical section taken on the line 7—7 in Fig. 1.

Figure 8 is a perspective view of the hook retaining guard detached from the bait body.

Figure 9 is a perspective view of the bait body with the hook guard and decoy detached therefrom.

Figure 10 is a detail perspective view showing the manner and means of attachment of the spinners to the decoy.

Figure 11 is a detail view on an enlarged scale of one of the spinner attaching devices.

Similar parts are designated by the same reference numerals in the several figures.

The preferred construction of the fish bait is shown in the drawings and will be hereinafter described in detail, but it is to be understood that the invention is not restricted to the precise structure shown, since equivalent structures are contemplated and such will be included within the scope of the claims.

As shown in the present instance, the improved fish bait comprises a body 1, decoy 2 and fish hook 3. The body may be composed of any suitable material, it being preferably of the spoon type composed of a metal plate which is concave longitudinally and transversely on one side and convex on the other side, as shown. The body is provided at its forward end with a hole 4 for attachment of the line 5 to the bait, as by a snap-hook 6, and the body is provided at its rear end with a hook 7 for attachment of the fish hook 3 to the bait, the hook 7 having its shank welded or otherwise fixed to the concave side of the body so that the hook 7 projects rigidly from the concave side of the body and is adapted to engage in an eye 8 on the shank of the fish hook 3, the engagement of the hook 7 and eye 8 being such as to permit pivotal movement of the fish hook to a sufficient extent laterally and vertically but substantially preventing twisting of the fish hook so that the point thereof will be held in an upwardly or downwardly pointed direction, according to the manner in which its eye 8 is attached to the hook 7. The fish hook 7 is shown provided with the usual clothing 9, but it is to be understood that unclothed hooks may be used and hooks of different lengths or sizes may be attached interchangeably to the bait body by means of the hook 7 on the body and an eye on the hook. The hook 7 is offset forwardly from the rear edge of the bait body so that the shank of the fish hook will rest on this edge of the body and thereby support the fish hook in a substantially horizontally extended position, as shown in Figs. 3 and 4.

The hook 7 is preferably an open one, as shown, in order to facilitate changing of fish hooks, and the present invention provides means for retaining the fish hook eye in engagement with the hook 7 and for controlling the angular movement of the fish hook relatively to the bait body and thus maintaining it in properly extended relation with the body. For this purpose, the bait body is provided about midway of its length and centrally of its width with a slot 10, and a guard member 11 is provided which is of a width to extend through said slot so that one end of this member may lie against the concave side of the body and its other end may lie against the convex side of the body at the respective ends of the body, and this member is curved to conform substantially with the respective portions of the body against which they lie. The end of the member 11 at the concave side of the body is bent into channel form as shown in detail in Fig. 7 to provide a housing 12 which is adapted to fit over the eye 8 of the fish hook and its attaching hook 7 and thereby prevent accidental detachment of said eye and hook, the edges of this housing extending toward or engaging the adjacent side of the body and thus confining the shank of the fish hook and limiting the extent to which the fish hook may swing angularly about the attaching hook 7.

The guard member 11 is connected to the bait body to prevent its detachment therefrom by a loop 13 which is welded or otherwise fixed to the member 11 and receives a pin 14 which is welded or otherwise fixed to the bait body at opposite sides of the slot 10, this loop and cooperating pin providing a pivotal connection between the retaining member 11 and the bait body and also providing for a limited movement of the member 11 relatively to the bait body, as will be understood from Fig. 5. In order to retain the member 11 in its normal operative position, as shown in Fig. 4, the forward end of the member 11 is bent over to form a locking hook 15 the two legs of which are provided with registering holes 16. In the normal operative position of the member 11, the hook 15 thereon is engaged over the forward edge of the bait body with its holes 16 in register with the hole 4 in the forward end of the body, and the snap hook 6 extends through these holes and thereby prevents longitudinal movement of the member 11 relatively to the bait body, but when the snap hook is detached and removed from these holes, the member 11 may be shifted forwardly relatively to the body, thereby disengaging the locking hook 15 from the forward edge of the body, thus freeing the member 11 for swinging movement from the position shown in Fig. 4 to the position shown in Fig. 5, the attaching hook 7 being then uncovered so that a fish hook engaged thereon may be removed and another fish hook substituted.

The present invention provides a decoy of improved structure which may be readily made inexpensively from sheet material bent into appropriate form. As shown in the present instance, the decoy comprising a yoke-shaped member 20 having a pair of legs 21, the width of the member 20 being such that these legs may occupy positions in properly spaced relation at the respective sides of the bait, and the rear portion of the legs are bent outwardly as at 22 to form guards to which spinners or other suitable decoys are attached. In the present instance, a spinner 23 is attached to each of these guards by a swivel 24 which is provided with an eye 25 which is engageable with an eye 26 which is welded or otherwise suitably fixed to the underside of the respective guard 22, each of these eyes 26 preferably comprising a wire loop having overlapping ends which may be spread apart to permit insertion or removal of the eye 25 of the respective spinner, thus enabling the spinners to be changed easily by hand without requiring the use of tools. The yoke-shaped member 20 of the decoy is attached to the underside of the member 11 for free pivotal movement thereon in a vertical plane by one or more wire loops 27 which are attached to the underside of the member 11 by a plate 28 which is welded or otherwise suitably fixed thereto and provided with depressions therein to accommodate the wire composing these loops, and the yoke-shaped member 20 is provided with one or more holes 29 to receive these loops, and the ends of the wire composing each of these loops being over-lapped but capable of being spread apart to permit attachment and detachment of these loops with respect to the plate 28.

In using the improved fish bait constructed as herein shown and described, the member 11 is locked in its operative position by the hook 15 on its forward end secured by the snap hook 6 inserted through the hole 4 in the bait body and the holes 16 in the legs of the hook 15. The guard 12 then secures the fish hook 3 from detachment from the hook 7 on the body and also controls the lateral swing of the fish hook so that it will maintain a rearwardly extended position relatively to the body. Relative forward motion of the bait in the water will cause the decoy 2 and the spinners thereon to assume a rearwardly trailing position as shown in Figs. 1 and 2 and the spinners will be free to revolve, the decoy then presenting an attractive appearance which will induce the fish to strike. Since the fish hook is attached to the body at a point adjacent to the rear end of the body, the spinners will not become entangled therewith.

When it is desired to change the fish hook in use for another hook of a different size or type, it is only necessary to detach the snap hook 6 from the locking hook 15 and then slide the member 11 forwardly on the body until the tip of this hook is clear of the forward edge of the body, whereupon the member 11 is free to swing downwardly under the weight of the decoy suspended thereon into the position shown in Figure 5. The housing 12 on the member 11 will then uncover the hook 7 and eye 8 and thereby enable the fish hook to be changed, as may be desired. Upon returning the member 11 to the position shown in Figs. 3 and 4 and shifting said member rearward to engage the hook 15 over the forward edge of the body and inserting the snap hook 6 through the holes in the hook 15 and the hole in the body, the parts are locked, thereby preventing accidental detachment of the fish hook. This complete operation may be performed without requiring the use of any tools.

In order to change the decoy as a whole, it is only necessary to detach the yoke-like member 20 from the loops 27 and to insert the similar member of another decoy in these loops, and this operation may be performed easily by hand, without requiring the use of any tools. The spinners 23 are preferably attached to the swivels 24 by loops 30 like the loops 26 so that the spinners may be readily detached and replaced by other spinners if desired without requiring the use of tools, as has been hereinbefore described respecting the loops 26.

Since the parts 23, 24, 25 and 26 of the decoy are loosely associated, they may spread out laterally from the respective sides of the body, thus contributing to the attractiveness of the bait to induce the fish to strike, and as the spinners are located forwardly of the fish hook 3, they will not foul the hook when they swing inwardly. The bait body 1 may be composed of a material which floats, in which event the decoy including the spinners thereon may swing downwardly into a suspended or pendant position as shown in Figs. 3 and 4, thus providing attraction to induce the fish to strike. The guards or shields 22 prevent the spinners 23 and swivels from being thrown back upon the legs 21 of the yoke 20 or upon the body of the bait itself. The holes 29 in the yoke 20 are preferably slightly larger than the loops 27 so as to allow a slight lateral movement of the decoy relatively to the bait body.

I claim as my invention:

1. A fish bait comprising a body, means fixed to the upper side of the body adjacent to its rear end for removably attaching a fish hook to the rear end of the body, a member having a guard on its rear end and pivotally connected to the body on a horizontal axis to swing relatively thereto to bring the guard on said member into a position to cooperate with the hook attaching means to retain the hook thereon, the forward end of said member being weighted to swing the guard by gravity into a position to uncover the hook attaching means, and line-attaching means cooperative with the body and the forward end of said member for retaining the guard in said covering position.

2. A fish bait comprising a body concave on its upper side and having a slot therein between its ends, a member having a channel-shaped guard on its rear end, said member extending longitudinally of the body and through said slot and pivotally connected between its ends to the body, a fish hook attaching device fixed to the upper side adjacent to the rear end of the body for positioning a fish hook while resting on the rear edge of the body to extend rearwardly therefrom, the attaching device being in a position to underlie the guard on the rear end of said member while the latter is swung into a position against the body, the guard being engageable by a fish hook on the attaching device to limit lateral swing of the fish hook, and means cooperative with the forward end of said member and with the body to hold said member while swung into said position against the body.

3. A fish bait comprising a body having a slot therein, a member loosely pivoted to and movable in the slot longitudinally of the body and having a guard thereon, and a portion engageable and disengageable with respect to the body by movement of said member longitudinally of the body to respectively secure said member from pivotal movement and to release it for pivotal movement relatively to the body, and a fish hook attaching device on the body in a position for cooperation of the guard therewith to retain the hook on said device.

4. A fish bait comprising a body having a slot therein, a member loosely pivoted on the body and movable in the slot longitudinally of the body and having a portion engageable and disengageable with respect to the body by such longitudinal movement to prevent or permit respectively pivotal movement of said member relatively to the body, a guard on said member, a fish hook attaching device on the body positioned to be uncovered by the guard when said member is swung into an angular position relatively to the body and to be covered by said guard when said member is swung into substantial parallelism with the body, and means for holding said member in the latter position.

5. A fish bait comprising a body having a slot therein between its ends, a member extending through said slot and connected to the body between its ends on a transverse horizontal axis to swing pivotally, a fish hook attaching device connected to the upper side of the body adjacent to its rear end, a guard on the rear end of said member for covering said fish hook attaching device when said member is swung into substantial parallelism with the body to retain a fish hook on said attaching device, decoys connected to said member at the forward side of its pivotal axis and weighting said member to swing the guard by gravity into uncovering position relatively to said attaching device, and means cooperative with the body and the forward end of said member to retain the guard in said covering position.

6. A fish bait comprising a body having a slot therein between its ends, a member extending through said slot and loosely pivoted between its ends to the body to swing pivotally on a horizontal axis and to move in the slot longitudinally relatively to the body, an open hook on the rear end of the body for attaching a fish hook thereto, a guard on the rear end of said member movable into a position to cover said open hook when said member is swung into substantial parallelism with the body and to uncover said open hook when swung into an angular position relatively to the body, and means on the forward end of said member engageable and disengageable with respect to the body by longitudinal movement of said member relatively to the body to respectively prevent or permit pivotal movement of said member.

7. A fish bait comprising a body having a slot therein between its ends, a member extending through said slot and loosely pivoted between its ends to the body to swing pivotally into angular and parallel positions and to move in the slot longitudinally relatively to the body, a device on the rear end of the body for attaching a fish hook thereto, a guard on the rear end of said member movable into a position to cover said attaching device when said member is swung into parallelism with the body and to uncover said device when said member is swung into an angular position relatively to the body, and a hook on the forward end of said member engageable with and disengageable from an edge of the body by longitudinal movement of said member relatively to the body to respectively lock said member from and release it for pivotal movement relatively to the body.

8. A fish bait comprising a concavo-convex body having a slot therein between its ends, a hook on the rear end of the body for detachably connecting a fish hook thereto, a member curved longitudinally in substantial conformity with the longitudinal curvature of the body and extending through the slot in the body and movable in the slot longitudinally of the body and loosely pivoted between its ends to the body for pivotal and longitudinal movements relatively thereto, a guard on the rear end of said member movable into a retaining position relatively to said hook on the rear end of the body by swinging movement of said member into substantial parallelism with the body, and a hook on the forward end of said member engageable with and disengageable from the forward edge of the body by longitudinal movement of said member relatively to the body.

9. A fish bait comprising a body having a concave upper side and a convex lower side and a slot therein between its ends, a hook on the upper side adjacent to the rear end of the body for detachably connecting a fish hook thereto, a member extending through the slot in the body from its lower to its upper side and movable in the slot longitudinally of the body and loosely pivoted between its ends to the body for pivotal and longitudinal movements relatively thereto, a guard on the rear end of said member movable toward the upper side of the body into a retaining position relatively to said hook by swinging movement of said member into substantial parallelism with the body, a hook on the forward end of said member engageable with and disengageable from the forward edge of the body by longitudinal movement of said member relatively to the body for locking the guard in retaining position relatively to the hook on the rear end of the body, and means connecting said hook on said member and the body for locking said member from longitudinal movement relatively to the body.

10. A fish bait comprising a body having a slot therein between its ends, a hook on the rear end of the body for connecting a fish hook thereto detachably and for lateral swinging movements, a member extending through the slot in the body and movable in the slot longitudinally of the body and loosely pivoted between its ends to the body for pivotal and longitudinal movements relatively thereto, a longitudinally flanged guard on the rear end of said member movable into a position above and at opposite sides of said hook by swinging movement of said member from angular to parallel relation with the body to retain a fish hook on said connecting hook and for engagement by its flanges with the fish hook to limit its lateral swinging movements, a hook on the forward end of said member engageable with or disengageable from the forward edge of the body by longitudinal movement of said member relatively to the body, and a line-attaching device extending through the hook on said member and the body for locking said member from longitudinal movement relatively to the body.

EDWARD L. FARLEY.

REFERENCES CITED

The following references are of record in the file of this patent:

UNITED STATES PATENTS

| Number | Name | Date |
|---|---|---|
| 1,731,161 | Farley | Oct. 8, 1929 |
| 1,738,617 | Scharrer | Dec. 10, 1929 |
| 1,910,742 | Binns | May 23, 1933 |
| 2,013,898 | Ridenour | Sept. 10, 1935 |
| 2,021,796 | Liotta | Nov. 19, 1935 |
| 2,125,030 | Ozburn | July 26, 1938 |
| 2,147,444 | Kelly | Feb. 14, 1939 |
| 2,238,604 | Sabin | Apr. 15, 1941 |
| 2,374,279 | Fugler | Apr. 24, 1945 |
| 2,435,730 | Worden | Feb. 10, 1948 |